US010869240B2

(12) United States Patent
Liu

(10) Patent No.: US 10,869,240 B2
(45) Date of Patent: Dec. 15, 2020

(54) METHOD AND DEVICE FOR ADJUSTING MOBILITY PARAMETER, COMPUTER STORAGE MEDIUM

(71) Applicant: SHANGHAI ZTE SOFTWARE CO., LTD., Shanghai (CN)

(72) Inventor: Ming Liu, Shanghai (CN)

(73) Assignee: Shanghai ZTE Software CO., LTD., Guangdong (CN)

( * ) Notice: Subject to any disclaimer, the term of this patent is extended or adjusted under 35 U.S.C. 154(b) by 0 days.

(21) Appl. No.: 16/612,392

(22) PCT Filed: Oct. 19, 2017

(86) PCT No.: PCT/CN2017/106874
§ 371 (c)(1),
(2) Date: Nov. 10, 2019

(87) PCT Pub. No.: WO2018/205501
PCT Pub. Date: Nov. 15, 2018

(65) Prior Publication Data
US 2020/0120564 A1 Apr. 16, 2020

(30) Foreign Application Priority Data
May 11, 2017 (CN) .......................... 2017 1 0329709

(51) Int. Cl.
H04W 36/00 (2009.01)
H04W 36/22 (2009.01)
H04W 36/32 (2009.01)

(52) U.S. Cl.
CPC ..... H04W 36/00837 (2018.08); H04W 36/22 (2013.01); H04W 36/32 (2013.01)

(58) Field of Classification Search
CPC ............................................... H04W 36/00837
USPC ............................................................ 455/438
See application file for complete search history.

(56) References Cited

U.S. PATENT DOCUMENTS

2011/0223918 A1* 9/2011 Dahlen ................. H04W 24/00
455/436
2017/0055192 A1* 2/2017 Johansson ............. H04W 36/30

FOREIGN PATENT DOCUMENTS

| CN | 102264108 A | 11/2011 |
| CN | 102395157 A | 3/2012 |
| CN | 102404784 A | 4/2012 |
| CN | 102547859 A | 7/2012 |
| CN | 102695209 A | 9/2012 |
| CN | 103037440 A | 4/2013 |
| CN | 104754543 A | 7/2015 |

OTHER PUBLICATIONS

WIPO, International Search Report dated Jan. 20, 2018.

* cited by examiner

Primary Examiner — Joel Ajayi

(57) ABSTRACT

A method and a device for adjusting a mobility parameter and a computer storage medium are provided. The method includes: selecting, according to a load condition of a current cell, a target neighboring cell for load balance; comparing a mobility parameter of the target neighboring cell with a load balance threshold of the current cell to obtain a comparison result; and adjusting, according to the comparison result, the mobility parameter of the target neighboring cell.

7 Claims, 3 Drawing Sheets

METHOD AND DEVICE FOR ADJUSTING MOBILITY PARAMETER, COMPUTER STORAGE MEDIUM

TECHNICAL FIELD

The present disclosure relates to the field of communication technologies, and in particular, to a method and a device for adjusting a mobility parameter, and a computer storage medium.

BACKGROUND

Load balance refers to reasonably deploying operating traffic of cells according to the load conditions of a serving cell and a neighboring cell thereof, and balancing the load among cells, frequencies and other wireless access technologies in a system, so that system resources can be effectively utilized, and user perception and system stability are improved.

The load balance function includes two parts of a connected Load Balance (LB) and a Camp Load Balance (CLB). The connected LB is mainly used for connected users and performed by handover. The CLB is mainly used for users changed from the connected state to the idle state and performed by means of reselection (changing reselection priority).

FIG. 1 is a schematic diagram of LB technology.

The cell of the commercial macro station and the neighboring cell thereof in the existing network do not necessarily have good overlapping coverage, and the outfield generally adopts a measurement-based load balance function, in consideration of the success rate of the handover for the balance. When a user is handed over from a high-load cell to a low-load cell, firstly, an A4 measurement needs to be issued and the signal coverage condition of a neighboring cell is measured. After the user reports an A4 measurement report of a target cell, the handover starts.

Due to the handover mechanism of the load balance, after a user is balanced to a low-load target cell, it is necessary to prevent the user from triggering coverage-based handover and handing over back to a high-load cell. On the other hand, it is also necessary to prevent the user from reselecting back to the high-load cell after the target cell is released. Thus, the handover/reselection parameters of the current cell and the target cell need to be configured appropriately. A ping-pong effect may occur between the load balance and the coverage-based handover/reselection, and the ping-pong effect needs to be suppressed through appropriate configuration of the parameters, otherwise the effect of the load balance will be affected.

At present, the existing network has the following four measures for preventing the ping-pong effect between the load balance and the coverage-based handover/reselection.

1. Handover suppression based on a ping-pong handover protection timer. The target cell sets a ping-pong handover protection timer for the handover-in user, and the handover-in user, including the handover-in user based on coverage and load, is not allowed, before the timer is expired, to perform coverage-based handover to return to the source cell.

2. Handover suppression based on a special A2 event. For the handover-in user due to load balance, the target cell configures an offset value of A2 Hys for preventing the ping-pong effect for the UE (User Equipment) in the first reconfiguration of the A2 event measurement, and simultaneously starts an A2 event timer for preventing the ping-pong effect, so that the handover-in UE due to the load is difficult to meet the A2 event before the timer is expired.

3. The configured load balance A4 measurement threshold is higher than the handover A2 threshold, so as to prevent the ping-pong effect caused by the parameter configuration.

4. The configured load balance A4 measurement threshold is higher than the start measurement threshold of inter-frequency reselection, so as to prevent the ping-pong effect caused by the parameter configuration.

The above measures require manual configuration of the timer or threshold based on the parameter settings of the base station. The timer becomes invalid when it expires. Manually configuring each threshold based on the parameters of the base station adds redundant workload to the load balance function.

That is, in the current commercial network, the connected LB function uses a handover mode to migrate the UE from the high-load cell to the low-load cell, in which the UE may be handed over back to the high-load cell due to coverage-based handover or reselect back to the high-load cell after release, which results in that the effect of the load balance cannot be maintained and a large amount of meaningless handovers and reselections are generated, thereby affecting the stability of the network. An embodiment of the present disclosure is directed to solving the above-described practical network problems.

SUMMARY

A method and a device for adjusting a mobility parameter according to an embodiment of the present disclosure can solve the problem of a ping-pong handover and reselection after the load balance function is started.

According to an embodiment of the present disclosure, a method for adjusting a mobility parameter includes steps of: selecting, according to a load condition of a current cell, a target neighboring cell for load balance; comparing a mobility parameter of the target neighboring cell with a load balance threshold of the current cell to obtain a comparison result; and adjusting, according to the comparison result, the mobility parameter of the target neighboring cell.

According to an exemplary embodiment, the step of selecting, according to a load condition of a current cell, a target neighboring cell for load balance includes: comparing a load of the current cell with a load balance starting threshold; and in response to the load of the current cell being higher than the load balance starting threshold, selecting, as the target neighboring cell for load balance, a neighboring cell with a load lower than the load of the current cell from co-coverage neighboring cells.

According to an exemplary embodiment, the step of comparing a mobility parameter of the target neighboring cell with a load balance threshold of the current cell to obtain a comparison result includes: determining a difference value between the mobility parameter of the target neighboring cell and the load balance threshold of the current cell by comparing the mobility parameter of the target neighboring cell with the load balance threshold of the current cell.

According to an exemplary embodiment, the step of adjusting, according to the comparison result, the mobility parameter of the target neighboring cell includes: in response to the difference value between the mobility parameter of the target neighboring cell and the load balance threshold of the current cell being larger than or equal to a preset threshold value, continuously adjusting, according to an automatic adjustment step length, the mobility parameter of the target neighboring cell under a condition of not smaller than a minimum limit value of the mobility parameter, until a difference value between the adjusted mobility parameter of the target neighboring cell and the load balance threshold of the current cell is smaller than the preset threshold value.

According to an exemplary embodiment, after the step of adjusting, according to the comparison result, the mobility parameter of the target neighboring cell, the method further includes: comparing the load of the current cell when reaching a preset cycle time with the load balance starting threshold; and in response to the load of the current cell when reaching the preset cycle time being higher than the load balance starting threshold, recovering the mobility parameter of the target neighboring cell with a load higher than the load of the current cell, and in response to the load of the current cell when reaching the preset cycle time not being higher than the load balance starting threshold, recovering the mobility parameter of each selected target neighboring cell for load balance.

According to an embodiment of the present disclosure, a storage medium storing a program for implementing the above method for adjusting a mobility parameter is provided.

According to an embodiment of the present disclosure, a device for adjusting a mobility parameter includes: a selection module configured to select, according to a load condition of a current cell, a target neighboring cell for load balance; a comparison module configured to compare a mobility parameter of the target neighboring cell with a load balance threshold of the current cell to obtain a comparison result; and an adjustment module configured to adjust, according to the comparison result, the mobility parameter of the target neighboring cell.

According to an exemplary embodiment, the selection module is configured to compare a load of the current cell with a load balance starting threshold; and in response to the load of the current cell being higher than the load balance starting threshold, select, as the target neighboring cell for load balance, a neighboring cell with a load lower than the load of the current cell from co-coverage neighboring cells.

According to an exemplary embodiment, the comparison module is configured to determine a difference value between the mobility parameter of the target neighboring cell and the load balance threshold of the current cell by comparing the mobility parameter of the target neighboring cell with the load balance threshold of the current cell.

According to an exemplary embodiment, the adjustment module is configured to, in response to the difference value between the mobility parameter of the target neighboring cell and the load balance threshold of the current cell being larger than or equal to a preset threshold value, continuously adjust, according to an automatic adjustment step length, the mobility parameter of the target neighboring cell under a condition of not smaller than a minimum limit value of the mobility parameter, until a difference value between the adjusted mobility parameter of the target neighboring cell and the load balance threshold of the current cell is smaller than the preset threshold value.

According to an exemplary embodiment, the device for adjusting a mobility parameter further includes: a recovery module configured to, after the mobility parameter of the target neighboring cell is adjusted according to the comparison result, compare the load of the current cell when reaching a preset cycle time with the load balance starting threshold; and in response to the load of the current cell when reaching the preset cycle time being higher than the load balance starting threshold, recover the mobility parameter of the target neighboring cell with a load higher than the load of the current cell, and in response to the load of the current cell when reaching the preset cycle time not being higher than the load balance starting threshold, recover the mobility parameter of each selected target neighboring cell for load balance.

The present disclosure further provides a computer storage medium having at least one program stored therein that is executable by a computer, the at least one program, when executed by the computer, causing the computer to perform the above method for adjusting a mobility parameter.

An embodiment of the present disclosure provides a technical solution having the following beneficial effects.

Compared to the related art, an embodiment of the present disclosure can eliminate the risk of ping-pong handover or reselection occurring after the load balance function in the commercial network is started, so that the effect of the load balance is stabilized, and the mobility index of the network is stabilized due to the elimination of a large amount of ping-pong handovers and reselections.

DETAILED DESCRIPTION

The embodiments of the present disclosure will be described in detail below with reference to the accompanying drawings, and it should be understood that the embodiments described below are only for the purpose of illustrating and explaining the present disclosure, and are not to be construed as limiting the present disclosure.

Figure 1:
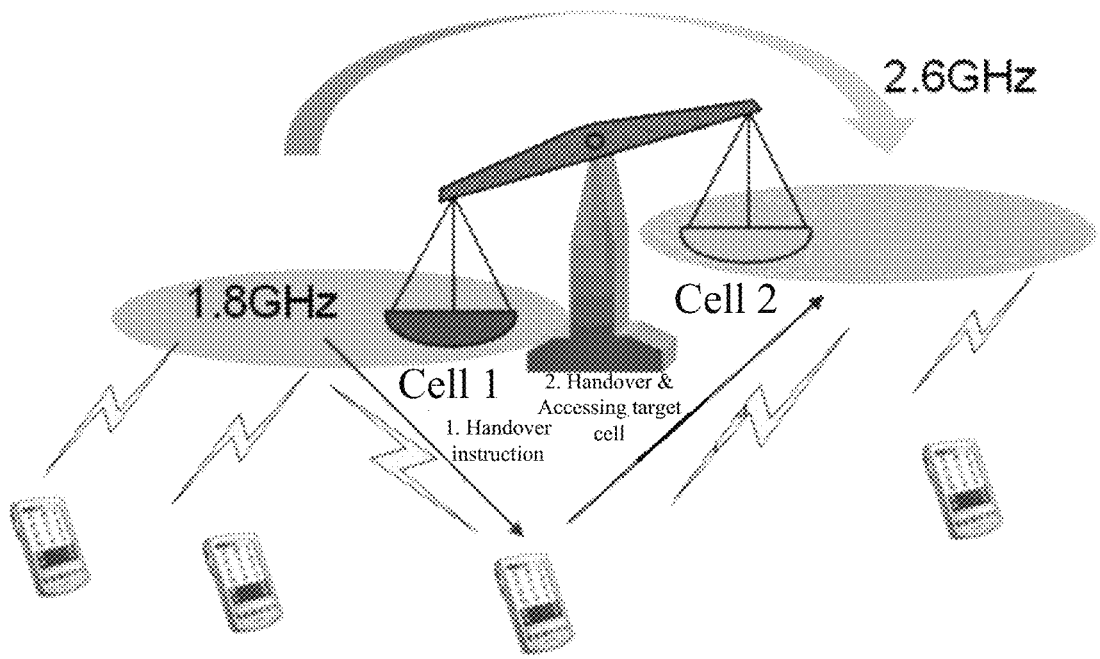
FIG. 1 is a schematic diagram of LB technology.
Figure 2:
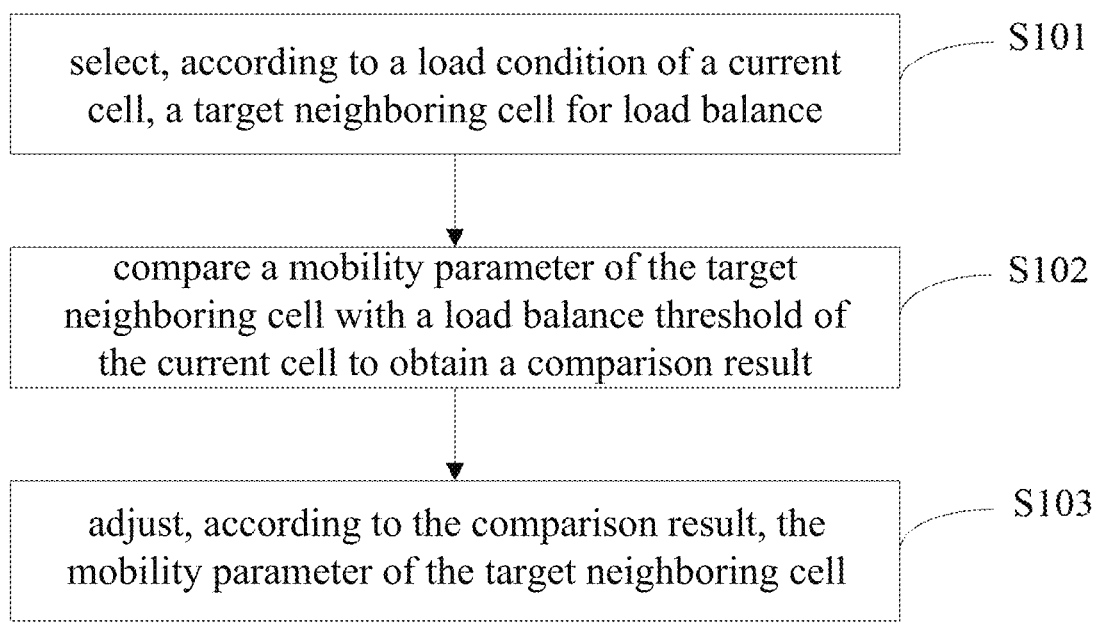
FIG. 2 is a block diagram of a method for adjusting a mobility parameter according to an embodiment of the present disclosure.

FIG. 2 is a block diagram of a method for adjusting a mobility parameter according to an embodiment of the present disclosure, and as shown in FIG. 2, the method includes: step S101, selecting, according to a load condition of a current cell, a target neighboring cell for load balance.

The step S101 includes: comparing a load of the current cell with a load balance starting threshold, and if the load of the current cell is higher than the load balance starting threshold, selecting a neighboring cell with a load lower than the load of the current cell from co-coverage neighboring cells and using the neighboring cell as the target neighboring cell for load balance. The target neighboring cell may be one or more target neighboring cells, and the selected target neighboring cell is put into a set N.

The method further includes: step S102, comparing a mobility parameter of the target neighboring cell with a load balance threshold of the current cell to obtain a comparison result.

The step S102 includes: determining a difference value between the mobility parameter of the target neighboring cell and the load balance threshold of the current cell by comparing the mobility parameter of the target neighboring cell with the load balance threshold of the current cell. The mobility parameter of the target neighboring cell includes $S_{NONINTRASEACH}$ and A2, and the load balance threshold of the current cell refers to a load balance A4 threshold. That is, the mobility parameters $S_{NONINTRASEACH}$ and A2 of the target neighboring cell need to be compared with the load balance A4 threshold of the current cell, respectively.

The method further includes: step S103, adjusting the mobility parameter of the target neighboring cell according to the comparison result. Specifically, a restrictive adjustment is performed on the mobility parameter of the target neighboring cell.

The step S103 includes: when the difference value between the mobility parameter of the target neighboring cell and the load balance threshold of the current cell is larger than or equal to a preset threshold value, continuously adjusting the mobility parameter of the target neighboring cell according to an automatic adjustment step length under the condition of not smaller than the minimum limit value of the mobility parameter, until the difference value between the adjusted mobility parameter of the target neighboring cell and the load balance threshold of the current cell is smaller than the preset threshold value. The selectable range of the preset threshold value is [−10, −1], e.g., the preset threshold value may be selected as −3, −4, −5, −6, or the like, preferably, −3. Taking the preset threshold value of −3 as an example, when the difference value between the mobility parameter $S_{NONINTRASEACH}$ of the target neighboring cell and the load balance A4 threshold of the current cell is larger than or equal to −3, the mobility parameter $S_{NONINTRASEACH}$ of the target neighboring cell is continuously adjusted according to an automatic adjustment step length Δ under the condition of not smaller than the minimum limit value α of $S_{NONINTRASEACH}$, until the difference value between the adjusted mobility parameter $S_{NONINTRASEACH}$ of the target neighboring cell and the load balance A4 threshold of the current cell is smaller than −3. Similarly, when the difference value between the mobility parameter A2 of the target neighboring cell and the load balance A4 threshold of the current cell is larger than or equal to −3, the mobility parameter A2 of the target neighboring cell is continuously adjusted according to an automatic adjustment step length Δ under the condition of not smaller than the minimum limit value β of A2, until the difference value between the adjusted mobility parameter A2 of the target neighboring cell and the load balance A4 threshold of the current cell is smaller than −3.

After the step S103, the load of the current cell when reaching a preset cycle time is compared with the load balance starting threshold, and if the load of the current cell when reaching the preset cycle time is higher than the load balance starting threshold, a recovery process is performed on the mobility parameter of a target neighboring cell with a load higher than the load of the current cell, otherwise, a recovery process is performed on the mobility parameters of all selected target neighboring cells for load balance.

It will be understood by those skilled in the art that all or part of the steps in the method of the above embodiment may be implemented by a program instructing a related hardware, and the program may be stored in a computer readable storage medium. That is, embodiments of the present disclosure may further provide a computer-readable storage medium on which a computer program is stored, and the program, when executed by a processor, implements the above-described steps S101 to S103. Further, the program or instructions, when executed by the processor, may also implement the step of the recovery process after the step S103. The storage medium may be a ROM/RAM, a magnetic disk, an optical disk, a flash memory, or the like.

Figure 3:
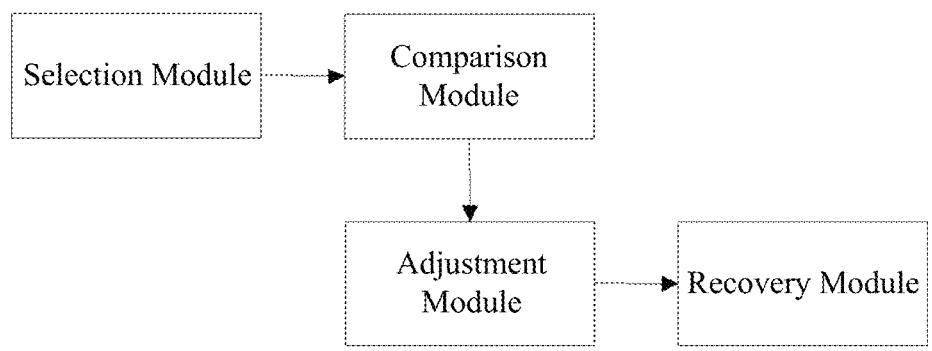
FIG. 3 is a block diagram of a device for adjusting a mobility parameter according to an embodiment of the present disclosure.

FIG. 3 is a block diagram of a device for adjusting a mobility parameter according to an embodiment of the present disclosure, and as shown in FIG. 3, the device includes a selection module configured to select, according to a load condition of a current cell, a target neighboring cell for load balance. The selection module is configured to compare a load of the current cell with a load balance starting threshold, and if the load of the current cell is higher than the load balance starting threshold, select at least one neighboring cell with a load lower than the load of the current cell from co-coverage neighboring cells and use the at least one neighboring cell as the target neighboring cell for load balance.

The device further includes a comparison module configured to compare a mobility parameter of the target neighboring cell with a load balance threshold of the current cell to obtain a comparison result. The comparison module is configured to compare the mobility parameters $S_{NONINTRASEACH}$ and A2 of the target neighboring cell with the load balance A4 threshold of the current cell, respectively, and determine difference values between the mobility parameters $S_{NONINTRASEACH}$ and A2 of the target neighboring cell and the load balance A4 threshold of the current cell.

The device further includes an adjustment module configured to adjust the mobility parameter of the target neighboring cell according to the comparison result, and specifically, perform a restrictive adjustment on the mobility parameter of the target neighboring cell. The adjustment module is configured to, when the difference value between the mobility parameter of the target neighboring cell and the load balance threshold of the current cell is larger than or equal to a preset threshold value (e.g., −3), continuously adjust the mobility parameter of the target neighboring cell according to an automatic adjustment step length under the condition of not smaller than the minimum limit value of the mobility parameter, until the difference value between the adjusted mobility parameter of the target neighboring cell and the load balance threshold of the current cell is smaller than the preset threshold value. The minimum limit value of the mobility parameter $S_{NONINTRASEACH}$ of the target neighboring cell is α, the minimum limit value of the mobility parameter A2 of the target neighboring cell is β, and the adjusted mobility parameter should be not smaller than a corresponding minimum limit value.

The device further includes a recovery module configured to compare, after the mobility parameter of the target neighboring cell is adjusted according to the comparison result, the load of the current cell when reaching a preset cycle time with the load balance starting threshold, and if the load of the current cell when reaching the preset cycle time is higher than the load balance starting threshold, perform a recovery process on the mobility parameter of a target neighboring cell with a load higher than the load of the current cell, otherwise, perform a recovery process on the mobility parameters of all selected target neighboring cells for load balance.

The above device may be implemented by a Radio Resource Management (RRM) module of a Base Band Unit (BBU) of a base station.

According to the method and the device of the present disclosure, it is possible to select the low-load cell, namely the target cell for load balance, among the co-coverage neighboring cells of the high-load cell when the load of the current cell is higher than a threshold. The mobility parameter (A2, $S_{NONINTRASEACH}$) threshold of the target cell is compared with the load balance A4 threshold of the current cell. Then, the mobility parameter causing the ping-pong effect in the handover for the balance is automatically adjusted under a safety limit, so that the risks of ping-pong handover and reselection are eliminated. According to the present disclosure, the ping-pong handover and reselection of User Equipment (UE) based on load and mobility between cells can be eliminated, and particularly, the method can be used for maintaining and optimizing the effect of the load balance function in the current commercial network, and avoiding unnecessary handover and reselection, thereby stabilizing indexes, networks and user perceptibility, and being suitable for a Long Term Evolution (LTE) system.

Figure 4:
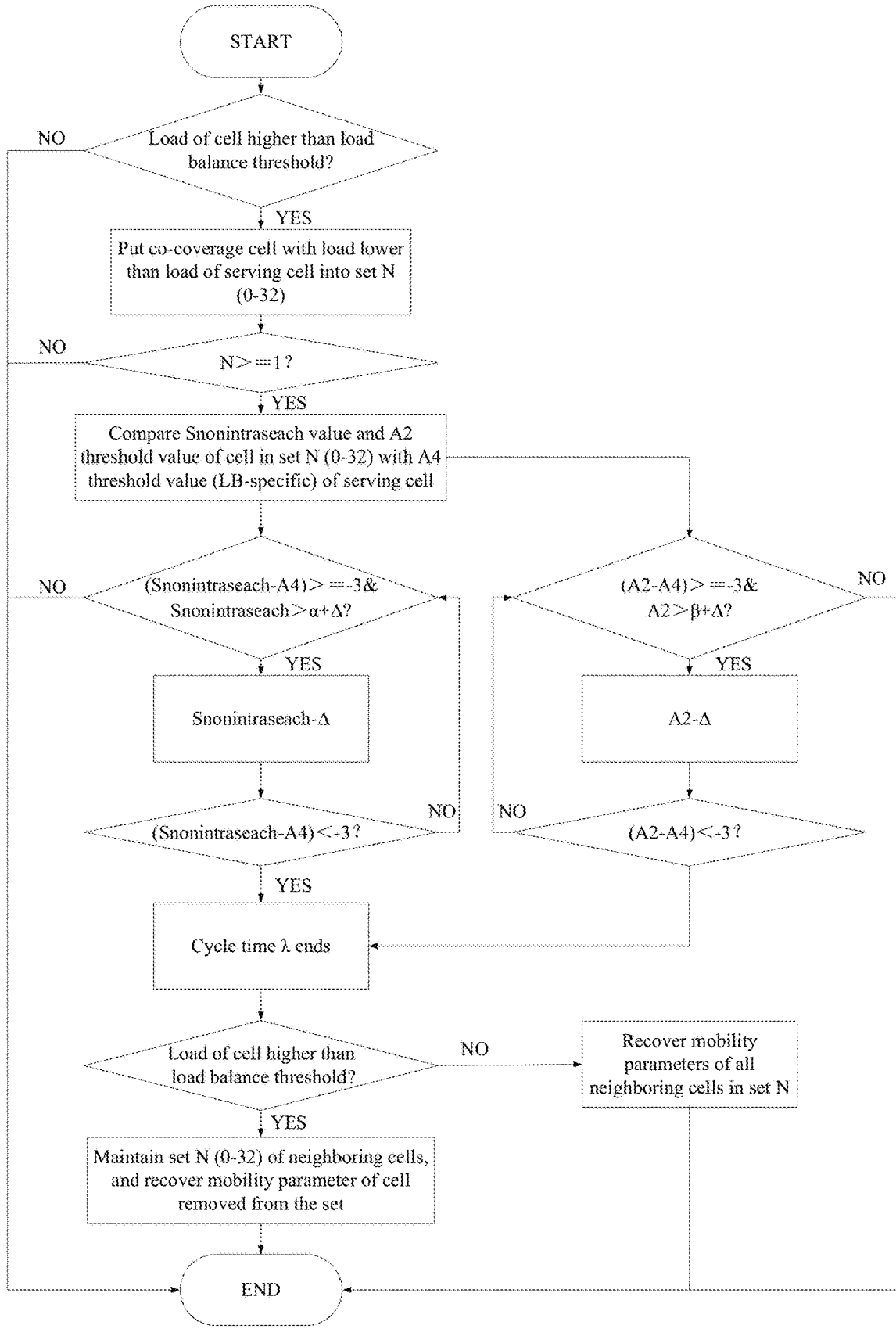
FIG. 4 is a flowchart of adjusting a mobility parameter in a load balance scenario.

FIG. 4 is a flowchart of adjusting a mobility parameter in a load balance scenario, which can prevent the ping-pong handover and reselection based on load balance and mobility, and as shown in FIG. 4, the steps thereof include: step (1), judging whether a load of a cell (namely, a present cell or a current cell) is higher than a balance function starting threshold (namely, a load balance starting threshold), namely, judging whether to start a load balance function. If yes, step (2) is performed, and otherwise, step (15) is performed.

The steps further include: step (2), selecting a co-coverage neighboring cell with a load lower than that of the cell from co-coverage neighboring cells of the cell (namely, the present cell or the current cell), and putting the co-coverage neighboring cell into a set N, and then performing step (3).

The N is defined as a set of neighboring cell, and the co-coverage neighboring cell with the load lower than that of the current cell (i.e., a target cell for load balance) is added into the set.

The steps further include: step (3), judging the number of the neighboring cell(s) in the set N, and if the number is larger than or equal to 1, performing step (4), and otherwise, performing step (15).

The steps further include: step (4), acquiring values of the mobility parameters $S_{NONINTRASEACH}$ and A2 of the neighboring cell in the set N, and then performing step (5) and step (6) in parallel.

The steps further include: step (5), judging whether the value of the mobility parameter $S_{NONINTRASEACH}$ of the neighboring cell minus the load balance A4 threshold value of the current cell is larger than or equal to a preset threshold value T, and judging whether the value of the mobility parameter $S_{NONINTRASEACH}$ of the neighboring cell is larger than $\alpha+\Delta$. If the two conditions are simultaneously satisfied, step (7) is performed, and otherwise, step (15) is performed.

That is, when $S_{NONINTRASEACH}-A4>=T$ and $S_{NONINTRASEACH}>\alpha+\Delta$ are simultaneously satisfied, step (7) is performed.

The value range of T is [−10, −1], for example, the preset threshold value T can be selected as −1, −3, −7, −8, −9, −10, or the like, and in this embodiment, the preset threshold value T is selected as −3, for example.

The above a is a minimum limit for automatically adjusting the value of $S_{NONINTRASEACH}$, and if the value of $S_{NONINTRASEACH}$ is smaller than the minimum limit, a risk that the terminal camps in a weak field rather than reselection may be caused. In view of that, a minimum value needs to be defined, and the value may be determined by an operator according to an actual situation.

The steps further include: step (6), judging whether the mobility parameter A2 threshold value of the neighboring cell minus the load balance A4 threshold value of the current cell is larger than or equal to T, and judging whether the value of A2 of the neighboring cell is larger than $\beta+\Delta$. If the two conditions are simultaneously satisfied, step (8) is performed, and otherwise, step (15) is performed.

That is, when $A2-A4>=T$ and $A2>\beta+\Delta$ are simultaneously satisfied, step (8) is performed.

The $\beta$ is a minimum limit for automatically adjusting the value of A2, and if the value of A2 is smaller than the minimum limit, a risk that the terminal camps in a weak field rather than handover may be caused. In view of that, a minimum value needs to be defined, and the value may be determined by an operator according to an actual situation.

The steps further include: step (7), the $S_{NONINTRASEACH}$ of the neighboring cell satisfying the conditions minus $\Delta$, and then performing step (9).

That is, the difference between the mobility parameter $S_{NONINTRASEACH}$ of the neighboring cell and $\Delta$ is taken as a new mobility parameter $S_{NONINTRASEACH}$ of the neighboring cell.

The steps further include: step (8), A2 of the neighboring cell satisfying the conditions minus $\Delta$, and then performing step (10).

That is, the difference between the mobility parameter A2 of the neighboring cell and $\Delta$ is taken as a new mobility parameter A2 of the neighboring cell.

The steps further include: step (9), judging whether $S_{NONINTRASEACH}$ of the neighboring cell minus $\Delta 4$ is smaller than T, and if yes, performing step (11), otherwise, performing step (5).

The steps further include: step (10), judging whether A2 of the neighboring cell minus $\Delta 4$ is smaller than T, and if yes, performing step (11), otherwise, performing step (6).

The $\Delta$ is a gain adjustment step length, namely, the step length of each automatic adjustment of the threshold, and is valued from 1 to 10, and the default thereof is 5 dB.

The steps further include: step (11), the cycle time $\lambda$ ends and step (12) is performed.

The X is a function operation cycle time, which starts to count when the function starts. When reaching the cycle time, the load of the cell is judged again, so as to confirm whether the mobility parameter of the neighboring cell needs to be recovered or not. Typically, it sets as 1 hour.

The steps further include: step (12), judging whether the load of the cell is higher than the load balance starting threshold (namely the balance function starting threshold), if yes, performing step (13), and otherwise, performing step (14).

The steps further include: step (13), maintaining the neighboring cell(s) in the set N. The neighboring cell with the load lower than that of the current cell is retained in the set N, and the adjusted mobility parameter thereof is not recovered; and the neighboring cell with the load higher than that of the current cell is removed from the set N, and the previously adjusted mobility parameter of the neighboring cell is recovered to the mobility parameter before the adjustment. Then, step (15) is performed.

The steps further include: step (14), all neighboring cell(s) are removed from the set N and the previously adjusted mobility parameters of the neighboring cell(s) are all recovered to the mobility parameters before the adjustment, and then step (15) is performed.

The flow ends at step (15).

The $S_{NONINTRASEACH}$ is a signal threshold value defined in the TS 36.304 specification. The parameter indicates a measurement trigger threshold of the inter-frequency/inter-system for cell reselection. If a current received signal strength of the UE is larger than the S_nonintrasearch, measurements of other systems or carrier frequencies with the priority equal to or lower than the priority of the current carrier frequency are not performed, and otherwise, the measurements of other systems or carrier frequencies with the priority equal to or lower than the priority of the current carrier frequency are performed.

The A2 represents a signal threshold value triggering an A2 event. The A2 event indicates that the UE starts an inter-frequency/inter-system measurement when the signal quality of the current cell received by the UE is lower than a certain threshold.

The A4 represents a signal threshold value triggering an A4 event. The A4 event indicates that the signal quality of the inter-frequency neighboring cell received by the UE is higher than a certain threshold, and is used for triggering an inter-frequency handover request to the inter-frequency neighboring cell.

In summary, the embodiments of the present disclosure have the following technical effects.

According to the present disclosure, considering the risk of the ping-pong handover or reselection occurring after the load balance function in the commercial network is started, the thresholds and the mobility parameters critical to the load balance function is restricted and automatically adjusted, thereby consolidating the effect of the load balance function, avoiding the ping-pong handover and reselection and keeping the index stable.

Although the present disclosure has been described in detail above, the present disclosure is not limited thereto, and various modifications may be made by those skilled in the art in light of the principle of the present disclosure. Thus, the modifications made in accordance with the principle of the present disclosure should be understood to fall within the scope of the present disclosure.

INDUSTRIAL APPLICABILITY

The technical solutions provided by the embodiments of the present disclosure can be applied to the field of communication technologies. By adopting the technical solutions provided by the embodiments of the present disclosure, the risk of the ping-pong handover or reselection occurring after the load balance function in the commercial network is started can be eliminated, so that the effect of the load balance is stabilized, and the mobility index of the network is stabilized due to the elimination of a large amount of ping-pong handovers and reselections.

What is claimed is:

1. A method for adjusting a mobility parameter, comprising steps of:
    selecting, according to a load condition of a current cell, a target neighboring cell for load balance;
    comparing a mobility parameter of the target neighboring cell with a load balance threshold of the current cell to obtain a comparison result; and
    adjusting, according to the comparison result, the mobility parameter of the target neighboring cell,
    wherein the mobility parameter of the target neighboring cell comprises a measurement trigger threshold $S_{NONINTRASEACH}$ and a first signal threshold value triggering an A2 event, and the load balance threshold of the current cell refers to a second signal threshold value triggering an A4 event,
    the $S_{NONINTRASEACH}$ indicates a measurement trigger threshold of an inter-frequency or inter-system for cell reselection, when a current received signal strength of a user equipment (UE) is larger than the $S_{NONINTRASEACH}$, measurements of other systems or carrier frequencies with a priority equal to or lower than a priority of a current carrier frequency are not performed, and when the current received signal strength of the UE is not larger then the $S_{NONINTRASEACH}$, the measurements of other systems or carrier frequencies with a priority equal to or lower than a priority of a current carrier frequency are performed,
    the A2 event indicates that a UE starts an inter-frequency or inter-system measurement when a signal quality of the current cell received by the UE is lower than a certain threshold, and
    the A4 event indicates that a signal quality of an inter-frequency neighboring cell received by a UE is higher than a certain threshold, and is used for triggering an inter-frequency handover request to the inter-frequency neighboring cell,
    wherein the step of comparing a mobility parameter of the target neighboring cell with a load balance threshold of the current cell to obtain a comparison result comprises:
    determining a first difference value between the $S_{NONINTRASEACH}$ and the second signal threshold value by comparing the $S_{NONINTRASEACH}$ and the second signal threshold value, and determining a second difference value between the first signal threshold value and the second signal threshold value by comparing the first signal threshold value and the second signal threshold value,
    wherein the step of adjusting, according to the comparison result, the mobility parameter of the target neighboring cell comprises:
    in response to the first difference value being larger than or equal to a preset threshold value, continuously adjusting, according to an automatic adjustment step length, the $S_{NONINTRASEACH}$ under a condition of the adjusted $S_{NONINTRASEACH}$ being not smaller than a minimum limit value of the $S_{NONINTRASEACH}$, until a difference value between the adjusted $S_{NONINTRASEACH}$ and the second signal threshold value is smaller than the preset threshold value, and
    in response to the second difference value being larger than or equal to the preset threshold value, continuously adjusting, according to the automatic adjustment step length, the first signal threshold value under a condition of the adjusted first signal threshold value being not smaller than a minimum limit value of the first signal threshold value, until a difference value between the adjusted first signal threshold value and the second signal threshold value is smaller than the preset threshold value.

2. The method of claim 1, wherein the step of selecting, according to a load condition of a current cell, a target neighboring cell for load balance comprises:
    comparing a load of the current cell with a load balance starting threshold; and
    in response to the load of the current cell being higher than the load balance starting threshold, selecting, as the target neighboring cell for load balance, a neighboring cell with a load lower than the load of the current cell from co-coverage neighboring cells.

3. The method of claim 2, after the step of adjusting, according to the comparison result, the mobility parameter of the target neighboring cell, further comprising:
    comparing the load of the current cell when reaching a preset cycle time with the load balance starting threshold; and
    in response to the load of the current cell when reaching the preset cycle time being higher than the load balance starting threshold, recovering the mobility parameter of the target neighboring cell with a load higher than the load of the current cell, and in response to the load of the current cell when reaching the preset cycle time not being higher than the load balance starting threshold, recovering the mobility parameter of each selected target neighboring cell for load balance.

4. A device for adjusting a mobility parameter, comprising:
a processor; and
a non-transitory computer storage medium, configured to store instructions,
wherein the processor is configured to execute the instructions to perform steps of:
selecting, according to a load condition of a current cell, a target neighboring cell for load balance;
comparing a mobility parameter of the target neighboring cell with a load balance threshold of the current cell to obtain a comparison result; and
adjusting, according to the comparison result, the mobility parameter of the target neighboring cell,
wherein the mobility parameter of the target neighboring cell comprises a measurement trigger threshold $S_{NONINTRASEACH}$ and a first signal threshold value triggering an A2 event, and the load balance threshold of the current cell refers to a second signal threshold value triggering an A4 event,
the $S_{NONINTRASEACH}$ indicates a measurement trigger threshold of an inter-frequency or inter-system for cell reselection, when a current received signal strength of a user equipment (UE) is larger than the $S_{NONINTRASEACH}$, measurements of other systems or carrier frequencies with a priority equal to or lower than a priority of a current carrier frequency are not performed, and when the current received signal strength of the UE is not larger than the $S_{NONINTRASEACH}$, the measurements of other systems or carrier frequencies with a priority equal to or lower than a priority of a current carrier frequency are performed,
the A2 event indicates that a UE starts an inter-frequency or inter-system measurement when a signal quality of the current cell received by the UE is lower than a certain threshold, and
the A4 event indicates that a signal quality of an inter-frequency neighboring cell received by a UE is higher than a certain threshold, and is used for triggering an inter-frequency handover request to the inter-frequency neighboring cell,
wherein the step of comparing a mobility parameter of the target neighboring cell with a load balance threshold of the current cell to obtain a comparison result comprises:
determining a first difference value between the $S_{NONINTRASEACH}$ and the second signal threshold value by comparing the $S_{NONINTRASEACH}$ and the second signal threshold value, and determining a second difference value between the first signal threshold value and the second signal threshold value by comparing the first signal threshold value and the second signal threshold value,
wherein the step of adjusting, according to the comparison result, the mobility parameter of the target neighboring cell comprises:
in response to the first difference value being larger than or equal to a preset threshold value, continuously adjusting, according to an automatic adjustment step length, the $S_{NONINTRASEACH}$ under a condition of the adjusted $S_{NONINTRASEACH}$ being not smaller than a minimum limit value of the $S_{NONINTRASEACH}$, until a difference value between the adjusted $S_{NONINTRASEACH}$ and the second signal threshold value is smaller than the preset threshold value, and
in response to the second difference value being larger than or equal to the preset threshold value, continuously adjusting, according to the automatic adjustment step length, the first signal threshold value under a condition of the adjusted first signal threshold value being not smaller than a minimum limit value of the first signal threshold value, until a difference value between the adjusted first signal threshold value and the second signal threshold value is smaller than the preset threshold value.

5. The device of claim 4, wherein the step of selecting, according to a load condition of a current cell, a target neighboring cell for load balance comprises:
comparing a load of the current cell with a load balance starting threshold; and
in response to the load of the current cell being higher than the load balance starting threshold, selecting, as the target neighboring cell for load balance, a neighboring cell with a load lower than the load of the current cell from co-coverage neighboring cells.

6. The device of claim 5, wherein the processor is further configured to execute the instructions to perform steps of:
after the mobility parameter of the target neighboring cell is adjusted according to the comparison result, comparing the load of the current cell when reaching a preset cycle time with the load balance starting threshold; and
in response to the load of the current cell when reaching the preset cycle time being higher than the load balance starting threshold, recovering the mobility parameter of the target neighboring cell with a load higher than the load of the current cell, and in response to the load of the current cell when reaching the preset cycle time not being higher than the load balance starting threshold, recovering the mobility parameter of each selected target neighboring cell for load balance.

7. A non-transitory computer storage medium having at least one program stored therein that is executable by a computer, the at least one program, when executed by the computer, causing the computer to perform the method for adjusting a mobility parameter of claim 1.

* * * * *